US005271227A

United States Patent [19]

Akiyama et al.

[11] Patent Number: 5,271,227

[45] Date of Patent: Dec. 21, 1993

[54] HYDRAULIC APPARATUS WITH PRESSURE COMPENSATING VALVES

[75] Inventors: Teruo Akiyama; Kiyoshi Shirai; Naoki Ishizaki; Koji Yamashita; Shinichi Shinozaki, all of Kanagawa, Japan

[73] Assignee: Kabushiki Kaisha Komatsu Seisakusho, Tokyo, Japan

[21] Appl. No.: 793,395

[22] PCT Filed: May 15, 1991

[86] PCT No.: PCT/JP91/00641

§ 371 Date: Jan. 9, 1992

§ 102(e) Date: Jan. 9, 1992

[87] PCT Pub. No.: WO91/18212

PCT Pub. Date: Nov. 28, 1991

[30] Foreign Application Priority Data

May 15, 1990 [JP] Japan .................................. 2-122951
May 15, 1990 [JP] Japan .................................. 2-122955
May 15, 1990 [JP] Japan .................................. 2-122956

[51] Int. Cl.[5] ......................... F16D 31/02; F15B 11/08

[52] U.S. Cl. ........................................ 60/422; 60/426; 60/459; 60/484; 91/446; 91/447; 91/468

[58] Field of Search ................. 60/420, 422, 423, 426, 60/427, 459, 484; 91/444, 446, 447, 468

[56] References Cited

U.S. PATENT DOCUMENTS 4,425,759 1/1984 Krusche .
4,617,854 10/1986 Kropp .............................. 60/422 X
4,823,551 4/1989 Hehl .................................. 60/423 X
4,938,023 7/1990 Yoshino ............................ 60/420 X
4,945,723 8/1990 Izumi et al. ....................... 91/518 X
5,067,389 11/1991 St. Germain ...................... 60/427 X
5,077,972 1/1992 Bianchetta et al. ................. 60/427
5,152,140 10/1992 Hirata et al. ...................... 91/446 X

FOREIGN PATENT DOCUMENTS 3844400 7/1990 Fed. Rep. of Germany .
59-197603 4/1984 Japan .
781409 11/1980 U.S.S.R. ................................ 60/420

*Primary Examiner*—Edward K. Look
*Assistant Examiner*—John Ryznic
*Attorney, Agent, or Firm*—Spensley Horn Jubas & Lubitz

[57] ABSTRACT

In the hydraulic apparatus (1) according to a first aspect of the present invention, mid-pressures between the inlet side and outlet side pressures of a first and a second pressure compensating valves (4, 4') are permitted to act on the flow rate decreasing side pressure receiving surfaces (4*b*, 4*b*') thereof through first and second mid-pressure supplying means (13, 13'), thereby restraining operational error and malfunction of the pressure compensating valves (4, 4'). In the hydraulic apparatus (20) according to a second aspect of the present invention. when actuating valves are made to assume neutral position, holding pressures of hydraulic actuators (5, 5') are permitted to act on flow rate decreasing side pressure receiving surfaces (4*b*, 4*b*') of pressure compensating valves (4), (4') so that spools of the pressure compensating valves are held at compensating position, thereby improving the response of the hydraulic actuators (5, 5') to lever actuation.

3 Claims, 6 Drawing Sheets

HYDRAULIC APPARATUS WITH PRESSURE COMPENSATING VALVES

TECHNICAL FIELD

The present invention relates to a hydraulic apparatus for driving a plurality of hydraulic actuators by discharge hydraulic oil from a single hydraulic pump.

BACKGROUND ART

To drive a plurality of hydraulic actuators by a single hydraulic pump, such a parallel circuit type hydraulic apparatus A as shown in FIG. 7 has commonly been used.

In the hydraulic apparatus A, hydraulic oil discharged from a hydraulic pump B is fed to a first hydraulic actuator D1 through a first actuating valve C1 and to a second hydraulic actuator D2 through a second actuating valve C2.

However, the above-mentioned arrangement of the hydraulic apparatus A has such a drawback that if the hydraulic oil is simultaneously fed to the plurality of hydraulic actuators D1 and D2, then the quantity of hydraulic oil fed to a lower load side hydraulic actuator becomes larger which results in that a higher load side hydraulic actuator is not supplied with a sufficient quantity of hydraulic oil.

FIG. 8 shows a hydraulic apparatus which has been proposed to obviate the drawback mentioned above. In this hydraulic apparatus A', a first and a second pressure compensating valves E1 and E2 are interposed between the first actuating valve C1 and the first hydraulic actuator D1 and between the second actuating valve C2 and the second hydraulic actuator D2.

Inlet side pressures of the first and second pressure compensating valves E1 and E2 are applied as pilot pressure to the flow rate increasing side pressure receiving surfaces of the spools in the respective pressure compensating valves E1 and E2, and output pressure from a shuttle valve F interposed between a hydraulic passage extending from the first pressure compensating valve E1 to the first hydraulic actuator D1 and a hydraulic passage extending from the second pressure compensating valve E2 to the second hydraulic actuator D2, is applied as pilot pressure to the flow rate decreasing side pressure receiving surface of the respective spools.

With the foregoing hydraulic apparatus A', the maximum hydraulic pressure at the higher load side hydraulic actuator D1 or D2 is permitted to act on the flow rate decreasing side pressure receiving surfaces of the pressure compensating valves E1, E2 under the action of the shuttle valve F, so that the flow rate of hydraulic oil at that one of the pressure compensating valves which is coupled to the higher load side hydraulic actuator, is restrained, while the flow rate of hydraulic oil at that one of the pressure compensating valves which is coupled to the lower load side hydraulic actuator, is increased.

Thus, even if the first and second hydraulic actuators D1 and D2 are loaded differently, a quantity of hydraulic oil which is proportional to the hydraulic passage opening area, i.e., the extent of lever actuation in the respective actuating valve C1, C2, is distributed to the respective hydraulic actuator D1, D2, irrespective of the difference in load between the hydraulic actuators.

In the above-described hydraulic apparatus A', the outlet port side pressure of the pressure compensating valve is permitted to act on the flow rate decreasing side pressure receiving surface of the spool therein, and outlet side pressure P3 is caused to be lower than the inlet side pressure P2 of the valve due to pressure loss which tends to be caused when the hydraulic oil passes through the pressure compensating valve.

The flow rate Q1 in the lower load side pressure compensating valve and the flow rate Q2 in the higher load side pressure compensating valve are given as follows:

$$Q1 = C\,a1\sqrt{P1 - P2 + (P2 - P3)}$$

$$Q2 = C\,a2\sqrt{P1 - P2}$$

where C is a constant, and a1 and a2 are the opening areas of the respective actuating valves.

In effect, an error corresponding to the pressure loss (P2−P3) in the pressure compensating valve is induced in the quantity of hydraulic oil distributed to each hydraulic actuator.

The drawback mentioned just above can be eliminated by causing the inlet port side pressure of the pressure compensating valve to act on the flow rate decreasing side pressure receiving surface of the valve; however, there arises such a problem that the pressure compensating valve tends to be erroneously operated by flow force occurring within the pressure compensating valve due to the fact that the inlet port side pressure P2, i.e., an equal pressure is permitted to act on the flow rate increasing side and flow rate decreasing side pressure receiving surfaces of the spool in the valve. More specifically, if the above-mentioned flow force acts in such a direction as to close the pressure compensating valve, then the inlet port side pressure P2 of the pressure compensating valve becomes higher than the outlet port side pressure $P_3$, and thus power loss is caused.

In view of the above-described state of art, it is a first object of the present invention to provide a hydraulic apparatus capable of preventing malfunction of pressure compensating valves, and distribution hydraulic oil to a plurality of hydraulic actuators with a proper flow rate corresponding to the extent of actuation of actuating valves.

As the actuating valves C1, C2 in the hydraulic apparatus of FIG. 8, three-way change-over valves are employed to permit the hydraulic actuators D1, D2 to be reversibly operated, the change-over valves arranged, at neutral position, to connect the pressure compensating valves E1, E2 in communication with a drain tank.

Thus, when the actuating levers of the actuating valves C1, C2 are made to assume neutral position, the hydraulic oil in the inlet side hydraulic passages of the pressure compensating valves E1, E2 is drained so that the spools are returned to their initial positions by holding pressures of the hydraulic actuators D1, D2.

Consequently, when the actuating lever is moved from the neutral position to the operating position, part of hydraulic oil discharged from the actuating valves C1, C2 is used to cause the spools of the pressure compensating valves to be displaced to a proper compensating position so that buildup of the maximum pressure provided by the shuttle valve F is delayed correspondingly, which leads to a reduction in the response of the hydraulic actuator to lever actuation.

In view of such a state of art, it is a second object of the present invention to provide a hydraulic apparatus capable of improving the response of hydraulic actuators to lever actuation of actuating valves.

In the hydraulic apparatus A' arranged as mentioned above, when the actuating levers of the actuating valves C1, C2 are simultaneously actuated with a maximum stroke, there arises such a problem that the maximum operating speed of the hydraulic actuators is decreased as compared with the parallel circuit type hydraulic apparatus A shown in FIG. 8.

More specifically, in case where the maximum quantity of hydraulic oil supplied from the hydraulic pump B is less than the sum of the quantities of hydraulic oil which are required by the respective hydraulic actuators D1, D2 when the levers are fully actuated, with the aforementioned parallel circuit type hydraulic apparatus A, more hydraulic oil is fed to the lower load side hydraulic actuator so that the maximum operating speed of the hydraulic actuators in the hydraulic apparatus A is maintained at a high value, whereas with the aforementioned hydraulic apparatus A' provided with pressure compensating valves, a limited quantity of hydraulic oil from the pump B is evenly distributed to the respective hydraulic actuators D1, D2 so that the maximum operating speed of the hydraulic actuators is reduced.

The above-mentioned phenomenon constitutes a cause for a machine using the hydraulic apparatus A' having the above construction to impart an uncomfortable feeling in terms of operation to an operator who is experience in operating a machine adopting the parallel circuit type hydraulic apparatus A such as power shovel or the like, for example.

In view of such a state of art, it is a third object of the present invention to provide a hydraulic apparatus capable of restricting the quantities of hydraulic oil supplied to the respective hydraulic actuators from becoming improper and providing a good operational feeling to an operator.

DISCLOSURE OF THE INVENTION

The hydraulic apparatus according to a first aspect of the present invention comprises first and second mid-pressure supplying means for applying mid-pressures of inlet port side and outlet port side pressures in a first and a second pressure compensating valves respectively to one of and the other one of the inlet ports of a shuttle valve.

With this hydraulic apparatus, the mid-pressures of the inlet port side and outlet port side pressures in the above pressure compensating valves are permitted to act on the flow rate decreasing side pressure receiving surfaces of the spools in the pressure compensating valves so that operational error and malfunction of the pressure compensating valves can be restrained to a maximum possible extent, while at the same time occurrence of error in the quantity of hydraulic oil distributed to each hydraulic actuator as well as occurrence of power loss can be prevented.

The hydraulic apparatus according to a second aspect of the present invention comprises a first and a second mid-pressure hydraulic passages for connecting inlet port side hydraulic passages and outlet port side hydraulic passages in a first and a second pressure compensating valves with each other; a first and a second circulating hydraulic passages for connecting the first and second mid-pressure hydraulic passages to the first and second actuating valves; and a first and a second comparing hydraulic passages for connecting the first and second actuating valves to a main shuttle valve; and a first and a second sub shuttle valves to which is applied the output pressure from the main shuttle valve, the output pressures of the first and second sub shuttle valves being permitted to act on flow rate decreasing side pressure receiving surfaces in the first and second pressure compensating valves.

With this hydraulic apparatus, by causing the holding pressure of the hydraulic actuators to act on the flow rate decreasing side pressure receiving surfaces of the pressure compensating valves when the actuating valves are neutral, the spools of the pressure compensating valves are held at compensating position, thereby improving the response of the actuating valves to lever actuation.

The hydraulic apparatus according to the third aspect of the present invention is arranged such that the area of the flow rate increasing side pressure receiving surface of the spool in at least one of the first and the second pressure compensating valves is set up to be greater than the area of the flow rate decreasing side pressure receiving surface of the spool in the at least one of the pressure compensating valves.

With this hydraulic apparatus, the pressure compensating accuracy in the pressure compensating valves is reduced so that the maximum operating speed of the hydraulic actuators is restrained from being decreased, thereby imparting good operational feeling to the operator, while at the same time restraining the quantities of hydraulic oil supplied to the respective hydraulic actuators from becoming improper.

BEST MODE FOR CARRYING OUT THE INVENTION

Description will now be made of embodiments of the present invention with reference to the accompanying drawings.

Figure 1:
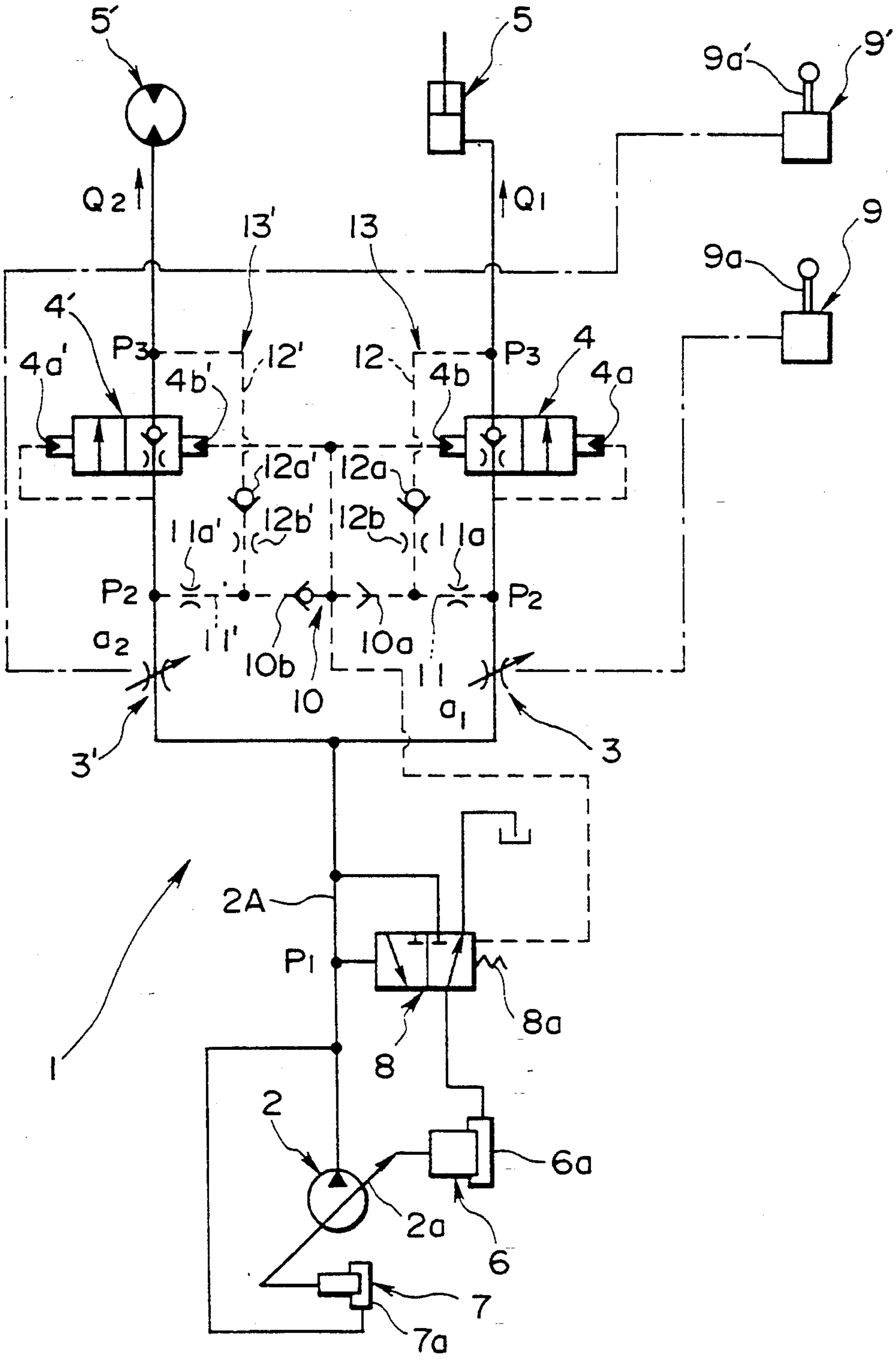
FIG. 1 is a hydraulic circuit diagram illustrating the hydraulic apparatus according to a first embodiment of the present invention.

In the hydraulic apparatus 1 according to a first embodiment of the present invention shown in FIG. 1, pressure oil pumped out of a hydraulic pump 2 is supplied via a first actuating valve 3 and a first pressure compensating valve 4 to a hydraulic cylinder 5 serving as a first hydraulic actuator, and the pressure oil is also supplied via a second actuating valve 3' and a second pressure compensating valve 4' to a hydraulic motor 5' serving as a second hydraulic actuator.

The hydraulic cylinder 5 and hydraulic motor 5' mentioned above are employed as an actuator for driving working machines such as a boom, an arm or a bucket of a construction machine like a power shovel or the like, or employed as a driving actuator for turning a cabin.

The hydraulic pump 2 is of the variable capacity type with which pressure oil discharge quantity per revolution can be changed by changing the angle of a wash plate 2a which is arranged to be tilted in such a direction that the capacity is decreased, by means of a large-diameter piston 6 and in such a direction that the capacity is increased, by means of a small-diameter piston 7. The large-diameter piston 6 has a hydraulic chamber 6a coupled to a discharge hydraulic passage 2A of the hydraulic pump 2 through a change-over valve 8, while the small-diameter piston 7 has a hydraulic chamber 7a connected directly to the discharge hydraulic passage 2A. The change-over valve 8 is pushed toward a communicating direction by the pressure in the discharge hydraulic passage 2A, and it is also pushed toward a draining direction by a spring 8a and an output pressure of a shuttle valve which will be described hereinafter. Thus, as discharge pressure P1 from the hydraulic pump 2 is increased, pressure oil is fed to the hydraulic chamber 6a of the large-diameter piston 6 so that the swash plate 2a is tilted in the capacity decreasing direction, while as the discharge pressure P1 is decreased, the pressure oil in the hydraulic chamber 6a is discharged into a drain tank so that the swash plate 2a is tilted in the capacity increasing direction. In this way, the swash plate 2a is set at a tilt angle corresponding to the discharge pressure.

The actuating valves 3, 3' are actuated such that their opening areas are increased or decreased in proportion to the quantity of pilot pressure oil supplied from pilot control valves 9, 9' and the quantity of pressure oil is increased or decreased in proportion to the stroke of actuating levers 9a, 9a'. As the actuating valves 3, 3', use is made of three-position change-over valves for permitting the hydraulic cylinder 5 and hydraulic motor 5' to be reversibly operated.

Inlet pressure of the first and second pressure compensating valves 4, 4' is applied as pilot pressure to flow rate increasing side pressure receiving surfaces 4a, 4a' of spools in the first and second pressure compensating valves 4, 4', and output pressure from a shuttle valve 10 interposed between a hydraulic passage between the first pressure compensating valve 4 and the hydraulic cylinder 5 and a hydraulic passage between the second pressure compensating valve 4' and the hydraulic cylinder 5' is applied as pilot pressure to flow rate decreasing side pressure receiving surfaces 4b, 4b' of the spools.

Inlet ports 10a and 10b of the shuttle valve 10 are coupled to inlet side hydraulic passages for the first and second pressure compensating valves 4 and 4' via a first and a second introducing hydraulic passage 11 and 11' respectively. Further, the inlet side hydraulic passages and outlet side hydraulic passages of the first and second pressure compensating valves 4 and 4' are connected with each other through the first and second introducing hydraulic passages 11 and 11' and through a first and a second branch hydraulic passage 12 and 12'.

The first and second introducing hydraulic passages 11 and 11' are provided with throttles 11a and 11a' respectively. The first and second branch hydraulic passages 12 and 12' are provided with one-way valves 12a and 12a' for permitting only pressure oil from the outlet side hydraulic passages of the first and second pressure compensating valves 4 and 4' to flow therethrough, and throttles 12b and 12b' located upstream of the one-way valves respectively.

The first introducing hydraulic passage 11 and first branch hydraulic passage 12 and the second introducing hydraulic passage 11' and second branch hydraulic passage 12' constitute first and second mid-pressure supplying means 13 and 13', respectively, which are arranged to apply mid-pressures between the inlet and outlet side pressures of the first and second pressure compensating valves 4 and 4' to the inlet ports 10a and 10b of the shuttle valve 10.

With the foregoing arrangement, in the shuttle valve 10, the mid-pressure based on the ratio of restriction areas of the throttles 11a and 12b of the first mid-pressure supplying means 13 is compared with the mid-pressure based on the ratio of restriction areas of the throttles 11a' and 12b' of the second mid-pressure supplying means 13', so that the maximum pressure is applied to the flow rate decreasing side pressure receiving surfaces 4b, 4b' of the pressure compensating valves 4, 4'.

In this way, operational error and malfunction of the pressure compensating valves 4, 4' can be restrained to a maximum possible extent, thereby decreasing error in hydraulic oil distribution to the hydraulic actuators 5, 5' which tends to be caused due to pressure loss in the pressure compensating valves 4, 4', while at the same time restraining power loss to a maximum possible extent.

Figure 2:
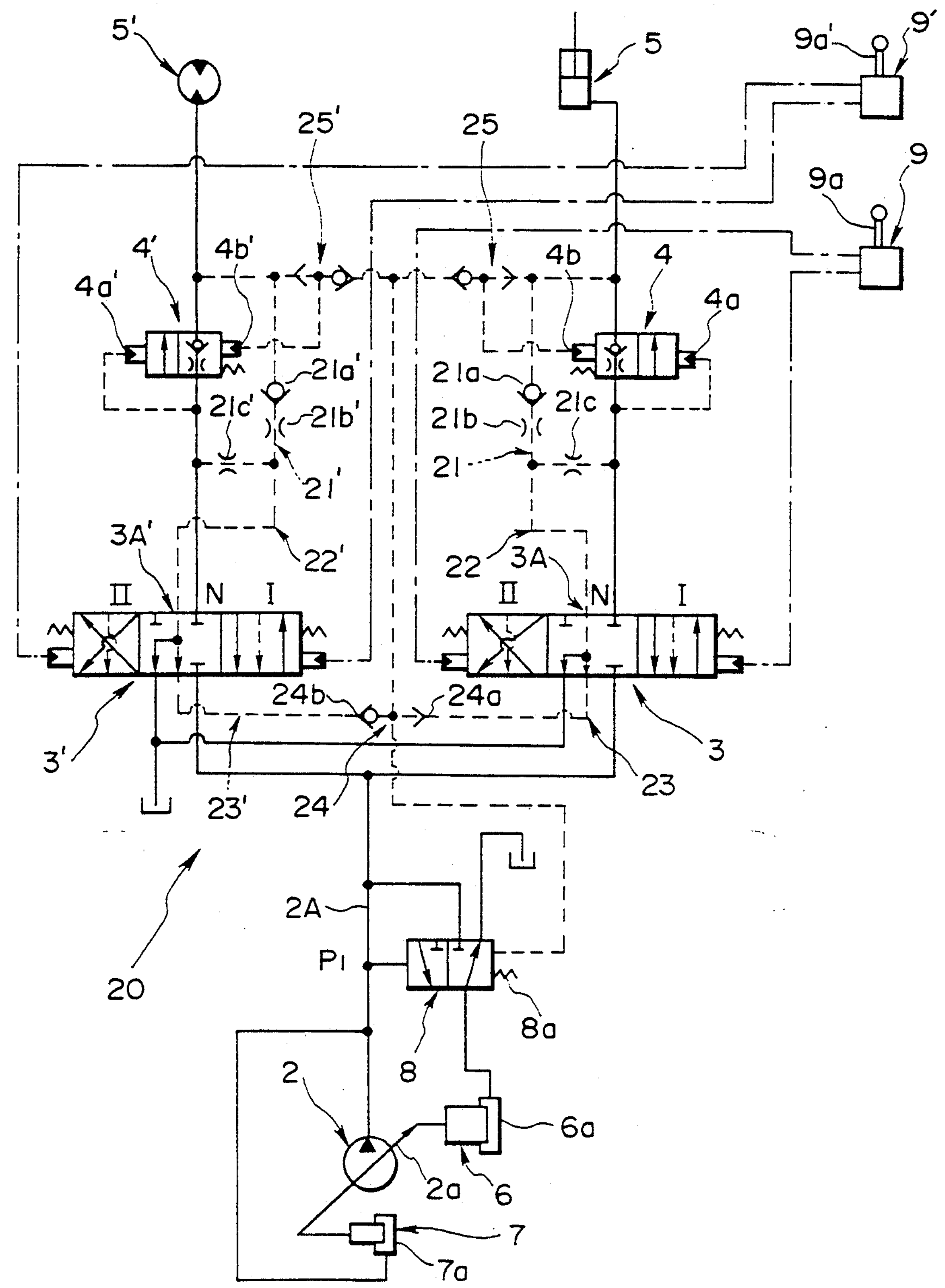
FIG. 2 is a hydraulic circuit diagram showing the hydraulic apparatus according to a second embodiment of the present invention.

Referring to FIG. 2, the hydraulic apparatus according to a second embodiment of the present invention is shown at 20, wherein hydraulic oil discharged out of a hydraulic pump 2 is applied, via a first actuating valve 3 and first pressure compensating valve 4, to a hydraulic cylinder 5 serving as a first hydraulic actuator, and via a second actuating valve 3' and second pressure compensating valve 4', to a hydraulic motor 5' serving as a second hydraulic actuator.

The constructions of the hydraulic pump 2, the pressure compensating valves 4, 4' and the hydraulic actuators 5, 5' are identical with the construction of the hydraulic pump 2, the pressure compensating valves 4, 4' and the hydraulic actuators 5, 5' of the hydraulic apparatus 1 shown in FIG. 1. Elements corresponding to those of the hydraulic apparatus 1 are indicated by like reference numerals, and further description thereof will be omitted.

Three-position change over valves are used as the actuating valves 3, 3' for the purpose of permitting the hydraulic cylinder 5 and hydraulic motor 5' to be reversibly operated. Load pressure ports 3A, 3A' of the actuating valves 3, 3', when placed at neutral position N, are disposed in communication with drain tanks, and, when placed at a first and a second hydraulic oil supplying position I and II, are disposed out of communication with the drain tanks and connect a first and a second circulating hydraulic passage 22 and 22' to a first and a second comparing hydraulic passage 23 and 23'. The actuating valves 3, 3' are actuated such that their opening areas are increased or decreased in proportion to the quantity of pilot hydraulic oil supplied from the pilot control valves 9, 9'. The pilot hydraulic oil is increased or decreased in proportion to the stroke of the actuating levers 9a, 9a'.

Inlet side pressures of the first and second pressure compensating valves 4 and 4' are applied as pilot pressures to flow rate increasing side pressure receiving surfaces 4a, 4a' the of spools of the pressure compensating valves 4, 4'; and inlet and outlet side hydraulic passages in the first and second pressure compensating valves 4 and 4' are coupled to a first and a second mid-pressure hydraulic passage 21 and 21' respectively.

The first and second mid-pressure hydraulic passages 21 and 21' are provided with one-way valves 21a and 21a' for permitting only hydraulic oil from the outlet side hydraulic passages to flow therethrough, and throttles 21b, 21c and 21b', 21c' located at the inlet side of the one-way valves 21a, 21a'.

Inlet side hydraulic passages of the one-way valves 21a, 21a' in the first and second mid-pressure hydraulic passages 21, 21' are coupled to inlet sides of the load pressure ports 3A and 3A' of the first and second actuating valves 3 and 3' through the first and second circulating hydraulic passages 22 and 22'; and the outlet sides of the load pressure ports 3A and 3A' in the first and second actuating valves 3 and 3' are connected to inlet ports 24a and 24b of a main shuttle valve 24.

Output pressure from the main shuttle valve 24 is applied to respective one inlet ports of a first and a second sub shuttle valves 25 and 25'; output pressures from the outlet side hydraulic passages of the one-way valves 21a and 21a' in the first and second mid-pressure hydraulic passages 21 and 21' are applied to the other inlet ports of the first and second sub shuttle valves 25 and 25', output pressures of the first and second sub shuttle valves 25 and 25' are imparted to flow rate decreasing pressure receiving surfaces 4b and 4b' of the respective spools in the first and second pressure compensating valves 4 and 4'.

With the foregoing arrangement, when the actuating valves 3, 3' are made to assume the first hydraulic oil supplying position I or the second hydraulic oil supplying position II, hydraulic oil discharged from the hydraulic pump 2 is supplied to the hydraulic cylinder 5 and hydraulic motor 5' via the actuating valves 3 and 3', while at the same time the load pressure ports 3A, 3A' of the actuating valves 3, 3' are disposed out of communication with the drain tanks whereby the first and second circulating hydraulic passages 22 and 22' are disposed in communication with the first and second comparing hydraulic passages 23 and 23'.

Consequently, mid-pressure of the inlet and outlet side pressures of the first and second pressure compensating valves 4 and 4' are applied as load pressures to the inlet ports of the main shuttle valve 24, and subsequently output pressure (maximum load pressure) from the main shuttle valve 24 is applied as pilot pressure to the flow rate decreasing side pressure receiving surfaces 4b, 4b' of the pressure compensating valves 4 and 4' via the first and second sub shuttle valves 25 and 25'.

In the event that holding pressure occurs in hydraulic actuator to which no hydraulic oil is applied, the actuator holding pressure, and the output pressure (maximum load pressure) from the main shuttle valve 24 are compared with each other in the first or second sub shuttle valve 25 or 25'; if the holding pressure at the actuator is higher than the output pressure of the main shuttle valve 24, then the holding pressure of the hydraulic actuator is applied as pilot pressure to the pressure compensating valve 4 or 4'.

Thus, the operational error and malfunction of the respective pressure compensating valves 4, 4' are restrained to a maximum possible extent, thereby decreasing error in hydraulic oil distribution to the respective hydraulic actuators which tends to be caused due to pressure loss in the pressure compensating valves 4, 4' and preventing malfunction of the pressure compensating valves which tends to caused by flow force. In this way, power can be restrained to a maximum possible extent.

When the respective actuating valves 3, 3' are made to assume the neutral position N and holding pressure is applied to the hydraulic cylinder 5 and hydraulic motor 5', the load pressure ports 3A, 3A' of the actuating valves 3, 3' are disposed in communication with the drain tanks so that hydraulic oil in the inlet side hydraulic passage of the respective pressure compensating valves 4, 4' is drained, while the holding pressure of the hydraulic cylinder 5 and hydraulic motor 5' is applied between the outlet side hydraulic passage of the one-way valves 21a and 21a' in the first and second mid-pressure hydraulic passages 21 and 21', i.e., the outlet side hydraulic passage of the first pressure compensating valve 4' and the one-way valve 21a'and between the outlet side hydraulic passage of the second pressure compensating valve 4' and the one-way valve 21a'.

The holding pressure of the hydraulic cylinder 5 and hydraulic motor 5' is passed from the first and second mid-pressure hydraulic passages 21 and 21' to the first and second sub shuttle valves 25 and 25', and compared, in the sub shuttle valves 25, 25', with the output pressure of the main shuttle valve 24.

At this point, the load pressures in the first and second comparing hydraulic passages 23 and 23' are zero since the hydraulic oil in the inlet side hydraulic passages of the respective pressure compensating valves 4, 4' are being drained as mentioned above. The output pressure of the main shuttle valve 24 is also zero as a matter of course.

Thus, the holding pressure of the hydraulic cylinder 5 and hydraulic motor 5' is applied, as it is, to the flow rate decreasing side pressure receiving surfaces 4b and 4b' of the first and second pressure compensating valves 4 and 4' as pilot pressure, so that the spools of the respective pressure compensating valves 4, 4' are held to compensating positions corresponding to the holding pressure of the hydraulic cylinder 5 and hydraulic motor 5'.

As a consequence, when it is attempted to supply hydraulic oil to the hydraulic cylinder 5 and hydraulic motor 5' by actuating the respective actuating valves 3, 3' to neutral position N, it is possible to set the spools of the respective pressure compensating valves 4, 4' at appropriate compensating position without a large quantity of hydraulic oil being supplied to the respective pressure compensating valves 4, 4', thereby improving the response of the hydraulic actuator to lever actuation of the actuating valves.

Figure 3:
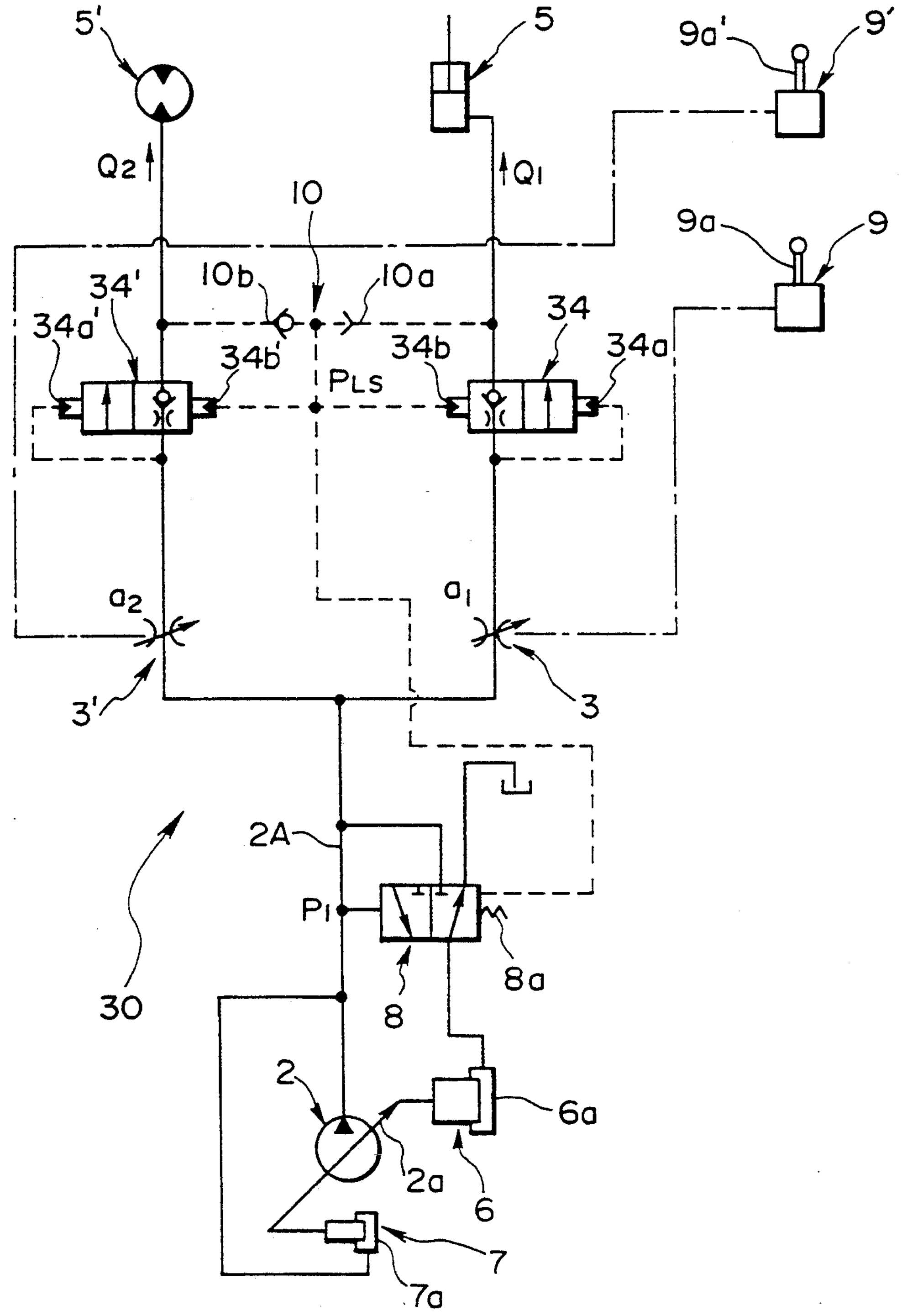
FIG. 3 is a hydraulic circuit diagram showing an example of the hydraulic apparatus according to a third embodiment of the present invention.

Referring to FIG. 3, the hydraulic apparatus according to a third embodiment of the present invention is shown at 30, wherein hydraulic pressure discharged from a hydraulic pump 2 is applied, via a first actuating valve 3 and a first pressure compensating valve 34, to a hydraulic cylinder 5 serving as a first hydraulic actuator, and also to a hydraulic motor 5' via a second actuating valve 3′ and a second pressure compensating valve 34′.

The construction of the hydraulic pump 2 and actuating valves 3, 3′ is identical with the construction of the hydraulic pump 2 and actuating valves 3, 3′ of the hydraulic apparatus shown in FIG. 1. Elements corresponding to those of the hydraulic apparatus 1 are indicated by like reference numerals, and further description thereof will be omitted.

Inlet side pressures of the first and second pressure compensating valves 34 and 34′ are applied as pilot pressure to flow rate increasing side pressure receiving surfaces 34*a*, 34*a*′ of spools in the respective pressure compensating valves 34, 34′, and output pressure of a shuttle valve 10 provided between a hydraulic passage extending from the first pressure compensating valve 34 to the hydraulic cylinder 5 and a hydraulic passage extending from the second pressure compensating valve 34′ to the hydraulic motor 5′, is imparted as pilot pressure to flow rate decreasing side pressure receiving surfaces 34*b*, 34*b*′ of the respective spools.

When the respective actuating valves 3, 3′ are actuated at the same time so that hydraulic oil discharged from the hydraulic pump 2 is applied to the hydraulic actuators 5, 5′, the hydraulic oil flow rate distribution due to the difference in load between the hydraulic actuators 5, 5′ is given as follows:

$$Q1 = C\,a1\sqrt{P1 - PLS} \quad (1)$$

$$Q2 = C\,a2\sqrt{P1 - PLS + (1 - Ab/Aa)PLS} \quad (2)$$

where Q1 is the flow rate of the hydraulic oil flowing to a higher load side hydraulic actuator, Q2 is the flow rate of the hydraulic oil flowing to a lower load side hydraulic actuator, Aa is the area of the flow rate increasing side pressure receiving surfaces in the pressure compensating valves 34, 34′, Ab is the area of the flow rate decreasing pressure receiving surfaces, C is a constant, a1 is the opening area of the high load side actuating valve, a2 is the opening area of the low load side actuating valve, P1 is the discharge pressure of the hydraulic pump, and PLS is the maximum load pressure from the shuttle valve 10.

When the load for the hydraulic cylinder 5 is higher than that of the hydraulic motor 5′, the pressure acting on the flow rate increasing side pressure receiving surface 34*a* of the first pressure compensating valve 34 becomes higher than the pressure acting on the flow rate decreasing side pressure receiving surface 34*b*, and thus the first pressure compensating valve 34 is made to assume a condition identical to the open condition of a load check valve.

In the contrast thereto, with the second pressure compensating valve 34′, in the case where the opening areas of the actuating valves 3 and 3′ are equal to each other, the flow rate Q2 of the hydraulic oil flowing to the lower load side hydraulic motor 5′ becomes higher than the flow rate Q1 of the hydraulic oil flowing to the higher load side hydraulic cylinder 5 when the pressure receiving area Aa of the hydraulic passage increasing side pressure receiving surface 34*a*′ is greater than the pressure receiving Ab of the hydraulic passage decreasing side pressure receiving surface 34*b*′, whereas when the pressure receiving areas Aa and Ab are equal to each other, the lower load side flow rate Q2 and the higher load side flow rate Q1 also becomes equal to each other.

Figure 5A:
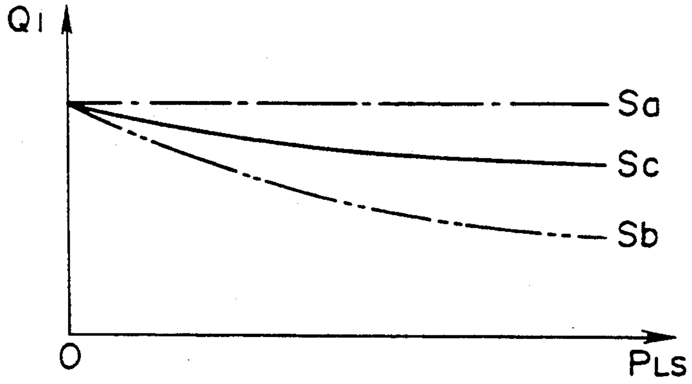
FIGS. 5(*a*) and 5(*b*) are graphs showing the relationships between maximum pressure and flow rate in a high load side hydraulic actuator and in a low load side hydraulic actuator provided in the third embodiment of the present invention, respectively.
Figure 5B:
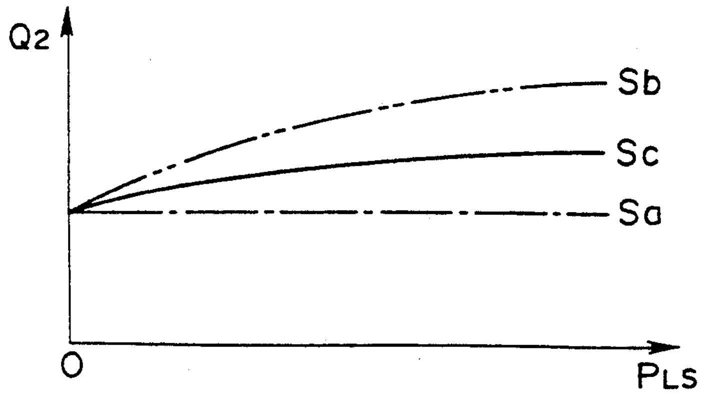
Figure 7:
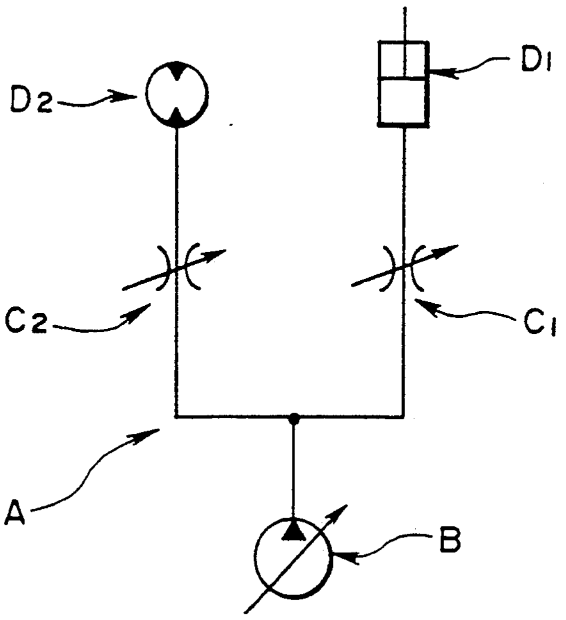
FIG. 7 PRIOR ART
FIG. 7 is a hydraulic circuit diagram showing a conventional parallel circuit type hydraulic apparatus.
Figure 8:
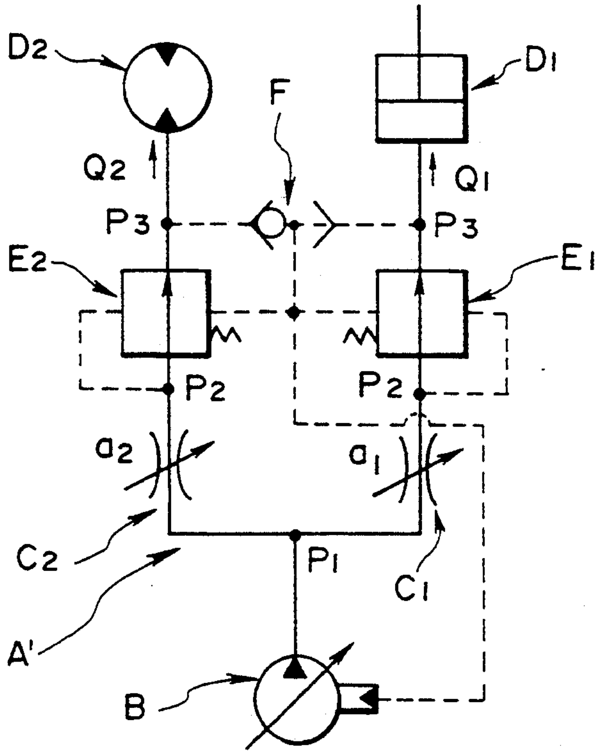
FIG. 8 PRIOR ART
FIG. 8 is a hydraulic circuit diagram showing a conventional hydraulic apparatus including pressure compensating values.

More specifically, when Aa=Ab, the characteristic of the hydraulic apparatus 30 turn out to be identical to the characteristic Sa, shown by one-dot chain line in FIGS. 5(*a*) and 5(*b*), of the conventional hydraulic apparatus provided with pressure compensating valves (see FIG. 8). By making Aa unequal to Ab, it is possible to achieve characteristic Sc (solid line) intermediate between the above-mentioned characteristic Sa and the characteristics Sb, shown by two-dot chain line, of the parallel circuit type hydraulic apparatus (see FIG. 7).

Furthermore, the characteristics Sc of the hydraulic apparatus 30 can be changed as desired between the characteristics Sa and Sb by changing the ratio of the pressure receiving areas As and Ab.

Figure 4:
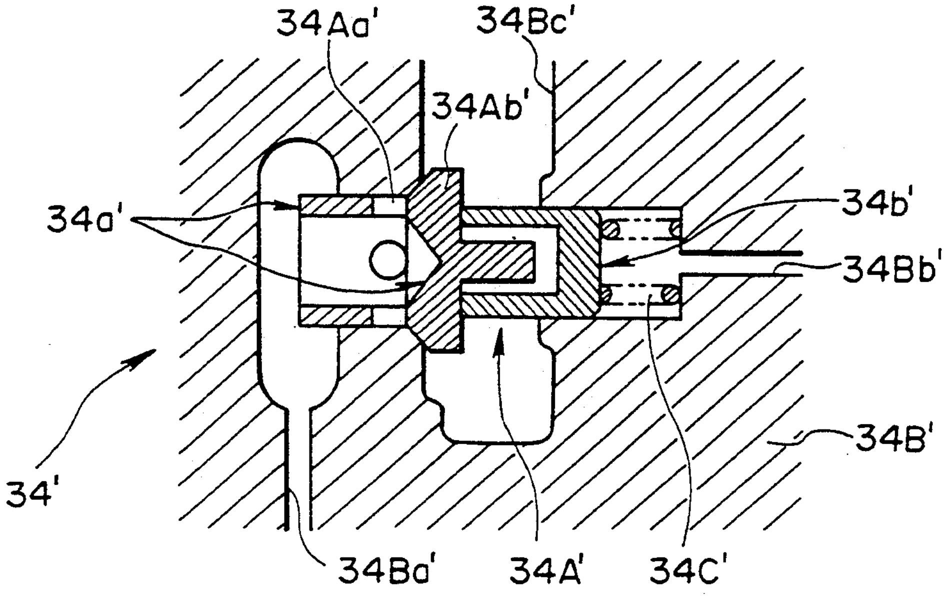
FIG. 4 is a sectional side view showing a pressure compensating valve provided in the third embodiment of the present invention.

The aforementioned pressure compensating valve 34′ comprises a spool 34A′, and a housing 34B′ accommodating the spool 34A′ as shown in FIG. 4, the spool 34A′ being provided with a restriction hydraulic passage 34Aa′ and a flange portion 34Ab′ constituting a check valve and being energized in a normally closed direction by means of a spring 34C′. In the drawing, reference 34Ba′ is an inlet port to which the inlet side pressure of the pressure compensating valve 34 is applied, and reference 34Bb′ is a pilot port to which the outlet side pressure of the pressure compensating valve 34′ is applied.

The pressure receiving area Aa of the hydraulic passage increasing side pressure receiving surface 34*a*′ at the spool 34A′ of the pressure compensating valve 34′ is set up to be greater than the pressure receiving area Ab of the hydraulic passage decreasing side pressure receiving surface 34*b*′.

Thus, when the plural actuating valves 3, 3′ are actuated with full stroke, more hydraulic oil is supplied to the lower load side hydraulic actuator so that the operating speed of the lower load side hydraulic actuator becomes higher than that of the higher load side hydraulic actuator, thereby making it possible to avoid any excessive decrease in the maximum speed of the hydraulic actuator as viewed from the standpoint of the entire hydraulic apparatus 30.

When it is attempted to supply hydraulic oil to one of the hydraulic actuators by actuating one of the actuating valves while hydraulic pressure is being supplied to the other hydraulic actuator through actuation of the other actuating valve, a larger quantity of hydraulic oil is supplied to the lower load side hydraulic actuator like in the above-described case, whereby decrease in the speed of the hydraulic actuator can be avoided.

Thus, even when a plurality of actuating levers are simultaneously actuated with a maximum stroke, actuation feeling similar to that of the conventional parallel circuit type hydraulic apparatus can be attained.

On the other hand, when the actuating levers are finely actuated, i.e., when the opening degree of the actuating valve is small so that the necessary quantity of hydraulic oil can be supplied to the respective hydraulic actuators from a hydraulic pump of limited capacity, a quantity of hydraulic oil proportional to the extent of actuation of the lever of each actuating valve is distributed to the respective hydraulic actuators under the action of the pressure compensating valves, whether the load is high or low.

It has been mentioned above that the pressure receiving area of the hydraulic passage increasing side pressure receiving surface is set up to be greater than that of the hydraulic passage decreasing side pressure receiving surface, and this may be done with respect to either one or both of the first and second pressure compensating valves 34 and 34'. In the case where the pressure receiving areas of one of the pressure compensating valves are made to be different from each other, the pressure receiving area of the hydraulic passage increasing side pressure receiving surface and that of the hydraulic passage decreasing side pressure receiving surface in the other pressure compensating valve are set up to be equal to each other.

Figure 6:
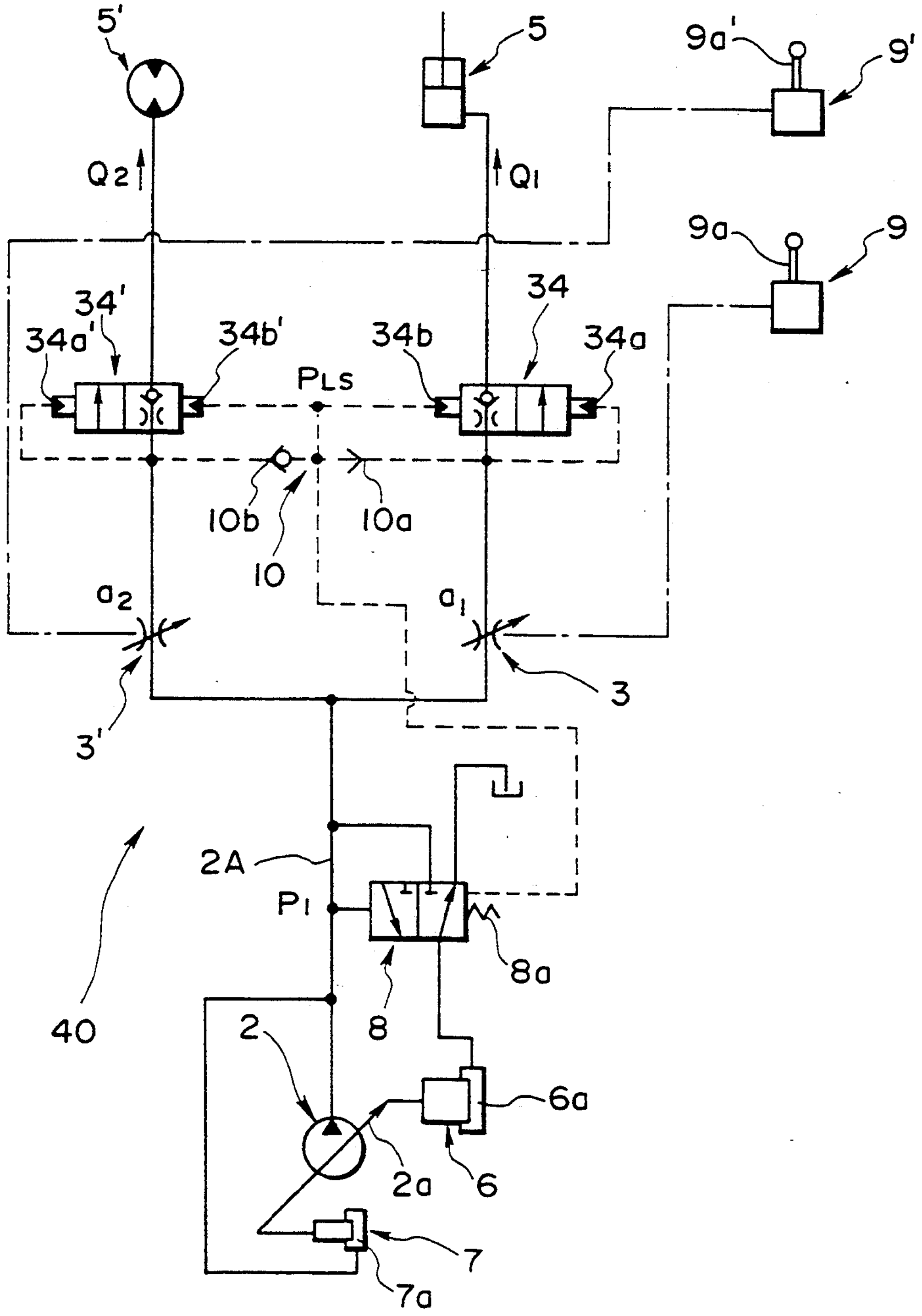
FIG. 6 is a hydraulic circuit diagram showing another example of the hydraulic apparatus according to the third embodiment of the present invention.

In the hydraulic apparatus 40 shown in FIG. 6, a shuttle valve 10 is connected to the outlet side hydraulic passages of pressure compensating valves 34 and 34'. The construction of the hydraulic apparatus 40, except for the disposition of the shuttle valve 10, is identical with that of the hydraulic apparatus 30 shown in FIG. 3. The operating manner of the hydraulic apparatus 40 is also similar to that of the hydraulic apparatus 30. Therefore, elements of the apparatus 40 which have the same function as those of the hydraulic apparatus 30 are indicated by the same references as in FIG. 3, and detailed description thereof will be omitted.

INDUSTRIAL APPLICABILITY

The hydraulic apparatus according to the present invention is advantageous in that a plurality of actuator are driven by means of a single hydraulic pump, and is most effectively applicable to construction machines including a plurality driving actuators or the like.

We claim:

1. A hydraulic circuit comprising:

a first and a second actuating valves interposed between a hydraulic pump, and a first and a second hydraulic actuators respectively;

a first and a second pressure compensating valves interposed between said first actuating valve and said first hydraulic actuator and between said second actuating valve and said second hydraulic actuator, respectively, said first and second pressure compensating valves being arranged such that output pressures of said first and second actuating valves act on flow rate increasing side pressure receiving surfaces of respective spools thereof;

a shuttle valve arranged such that part of hydraulic oil supplied from said first actuating valve to said first hydraulic actuator is applied to one of inlet ports thereof and part of hydraulic oil supplied from said second actuating valve to said second hydraulic actuator is applied to the other one of the inlet ports thereof, said shuttle valve being also arranged such that output pressure thereof acts on flow rate decreasing side pressure receiving surfaces of the respective spools in said first and second pressure compensating valves; and first mid-pressure supplying means and second mid-pressure supplying means for applying mid-pressures of inlet port side and outlet port side pressures in said first and second pressure compensating valves to one of and the other one of inlet ports of said shuttle valve respectively.

2. A hydraulic circuit according to claim 1, wherein said first and second mid-pressure supplying means comprise:

a first and a second introducing hydraulic passages for communicating the inlet side hydraulic passages of said first and second pressure compensating valves with said one and said other one of the inlet ports of said shuttle valve, each of said first and second introducing hydraulic passages being provided with a throttle; and a first and a second branch hydraulic passages for communicating the outlet side hydraulic passages of said first and second pressure compensating valves with downstream sides of said throttles in said first and second introducing hydraulic passages, each of said first and second branch hydraulic passages being provided with a one-way valve for permitting only hydraulic oil from the outlet side hydraulic passages of said first and second pressure compensating valves to flow therethrough, and a throttle located at the inlet side of said one-way valve.

3. A hydraulic circuit comprising:

a first and a second actuating valves interposed between a hydraulic pump, and a first and a second hydraulic actuators respectively;

a first and a second pressure compensating valves interposed between said first actuating valve and said first hydraulic actuator and between said second actuating valve and said second hydraulic actuator, said first and second pressure compensating valves being arranged such that output pressures from said first and second actuating valves act on flow rate increasing side pressure receiving surfaces of respective spools thereof respectively;

a first and a second mid-pressure hydraulic passages for connecting inlet port side hydraulic passages and outlet port side hydraulic passages in said first and second pressure compensating valves with each other, each of said first and second mid-pressure hydraulic passages being provided with a one-way valve for permitting only hydraulic oil from said outlet port side hydraulic passages to flow therethrough, and a throttle located at the inlet side of said one-way valve;

a first and a second circulating hydraulic passages for connecting inlet side hydraulic passages of said one-way valves in said first and second mid-pressure hydraulic passages to inlet sides of load pressure ports in said first and second actuating valves;

a first and a second comparing hydraulic passage for connecting outlet sides of the load pressure ports of said first and second actuating valves to one of and the other one of inlet ports of a main shuttle valve; and a first and a second sub shuttle valves arranged such that output pressure from said main shuttle valve is applied to one of inlet ports thereof and output pressures from the outlet sides of said one-way valves in said first and second mid-pressure hydraulic passages are applied to the other one of the inlet ports thereof, said first and second sub shuttle valves being also arranged such that output pressures thereof act on flow rate decreasing side pressure receiving surfaces of the respective spools in said first and second pressure compensating valves.

* * * * *